United States Patent
Wilton et al.

(10) Patent No.: US 10,386,487 B1
(45) Date of Patent: Aug. 20, 2019

(54) GEIGER-MODE LIDAR SYSTEM HAVING IMPROVED SIGNAL-TO-NOISE RATIO

(71) Applicant: Princeton Lightwave, Inc., Cranbury, NJ (US)

(72) Inventors: Samuel Richard Wilton, Hamilton, NJ (US); Evgenii Yuryevich Kotelnikov, Princeton, NJ (US)

(73) Assignee: ARGO AI, LLC, Pittsburgh, PA (US)

(*) Notice: Subject to any disclaimer, the term of this patent is extended or adjusted under 35 U.S.C. 154(b) by 413 days.

(21) Appl. No.: 15/254,816

(22) Filed: Sep. 1, 2016

Related U.S. Application Data

(60) Provisional application No. 62/273,179, filed on Dec. 30, 2015.

(51) Int. Cl.
*G01S 17/89* (2006.01)
*G01S 17/93* (2006.01)
*G01S 7/486* (2006.01)

(52) U.S. Cl.
CPC .......... *G01S 17/89* (2013.01); *G01S 7/4865* (2013.01); *G01S 17/933* (2013.01)

(58) Field of Classification Search
CPC .......... G01S 17/89; G01S 7/487; G01S 7/486
See application file for complete search history.

(56) References Cited

U.S. PATENT DOCUMENTS

| | | | |
|---|---|---|---|
| 6,421,033 B1 | 7/2002 | Williams et al. | |
| 2010/0020306 A1 | 1/2010 | Hall | |
| 2011/0216304 A1 | 9/2011 | Hall | |
| 2013/0099922 A1 | 4/2013 | Lohbihler | |
| 2015/0009485 A1 | 1/2015 | Mheen et al. | |
| 2015/0192676 A1* | 7/2015 | Kotelnikov | G01S 17/89 356/5.03 |

OTHER PUBLICATIONS

Cristiano Niclass et al., "Design and characterization of a 256×64-pixel single-photon imager in CMOS for a MEMS-based laser scanning time-of-flight sensor", "Optics Express", May 10, 2012, vol. 20, No. 11, Publisher: Optical Society of America, Published in: JP.

(Continued)

*Primary Examiner* — Luke D Ratcliffe
(74) *Attorney, Agent, or Firm* — Kaplan Breyer Schwarz, LLP

(57) ABSTRACT

A GmAPD-based LiDAR system and methods for developing a point-cloud image of a detection region are disclosed. The methods include scanning the detection region during a plurality of detection frames that defines an image frame. In each detection frame, the detection region is interrogated with a different one of a series of optical pulses and reflections of the optical pulse are detected at a GmAPD-based receiver that is gated such that a different sampling region within the detection region is selectively sampled in each detection frame. The sampling regions are defined such that longer-range areas of the detection region are sampled more times in the image frame than shorter-range areas of the detection region. As a result, objects throughout the entire detection region can be detected with high SNR.

21 Claims, 12 Drawing Sheets

(56) References Cited

OTHER PUBLICATIONS

Ito, et al., "System design and performance characterization of a MEMS-based laser scanning time-of-flight sensor based on a 256×64-pixel single-photon imager", 2013, pp. 1-15, Publisher: IEEE; Applied Optics Lab., Toyota Central R&D Labs, Inc.
"Light Detection and Ranging (LIDAR) Sensor Model Supporting Precise Geopositioning", "CSMWG Information Guidance Document", Aug. 1, 2011, pp. 183, vol. NGA.SIG.0004_1.1, Publisher: National Geospatial-Intelligence Agency.
William C. Stone et al., "Performance Analysis of Next-Generation LADAR for Manufacturing, Construction, and Mobility", May 1, 2004, vol. NISTIR 7117, Publisher: Naitonal Institute of Standards and Technology, Published in: US.
William E. Clifton et al., "Medium Altitude Airborne Geiger-mode Mapping Lidar System", doi: 10.1117/12.2193827, "Laser Radar Technology and Applications XX", Jun. 9, 2015, vol. 9465, 946506, Publisher: Proc of SPIE, Published in: US.
Valerie C. Coffey, "Seeing in the Dark: Defense Applications of IR imaging"; http://www.osa-opn.org/home/articles/volume_22/issue_4/features/seeing_in_the_dark_defense_applications_of_ir_ima/, "Optics & Photonics News", Apr. 1, 2011, Publisher: OSA The Optical Society, Published in: US.
Edoardo Charbon et al., "SPAD-Based Sensors", DOI: 10.1007/978-3-642-27523-4_2, "TOF Range-Imaging Cameras", pp. 11-38, Publisher: Springer-Verlag Berlin Heidelberg.

\* cited by examiner

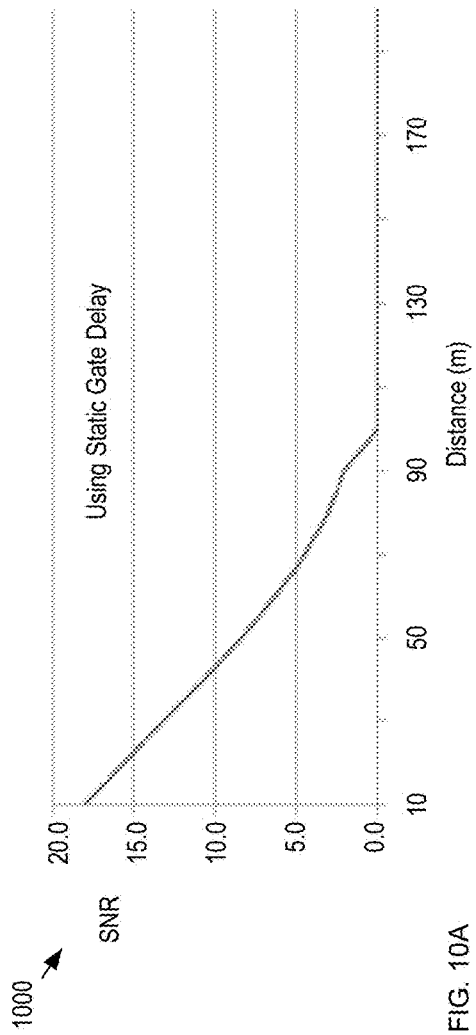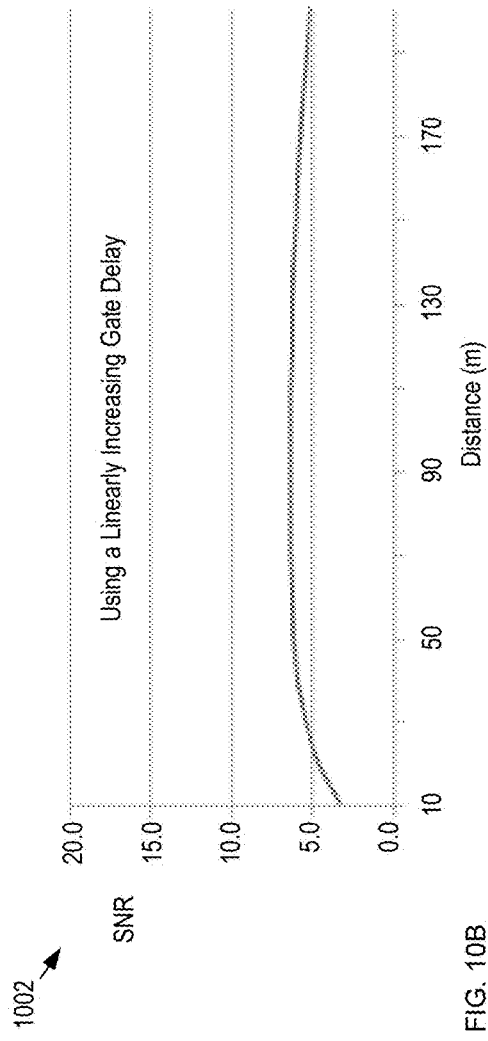

GEIGER-MODE LIDAR SYSTEM HAVING IMPROVED SIGNAL-TO-NOISE RATIO

CROSS REFERENCE TO RELATED APPLICATIONS

This case claims priority of U.S. Provisional Patent Application Ser. No. 62/273,179, filed Dec. 20, 2015, which is incorporated by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to laser range finding in general, and, more particularly, to LiDAR systems and methods.

BACKGROUND OF THE INVENTION

Light Detection And Ranging (LiDAR) systems are attractive for use in many applications, such as autonomous vehicles (e.g., automobiles, farm equipment, etc.), driver-assist systems (e.g., collision-avoidance systems, etc.), video-game controllers, virtual- and augmented-reality systems, and the like.

LiDAR is based on laser range finding technology, in which the position of an object in a detection region is determined by transmitting a pulse of light toward the detection region and determining the time at which a reflection of the light pulse off of the object is detected. The position of the object is estimated by the time-of-flight (TOF) of the optical pulse to and from the object.

For vehicular LiDAR, a three-dimensional local map around a vehicle is developed by performing laser range finding in several directions and elevations around the vehicle. This can be done in various ways, such as using arrays of laser sources and detectors, rotating a single laser source about an axis through the vehicle, or directing the output signal from a single source about the vehicle using a rotating mirror or prism, or a stationary reflective cone. For example, US Patent Publication No. 20110216304 describes a LiDAR system based on a vertically oriented array of emitter/detector pairs that are rotated about an axis to provide a 360° horizontal field-of-view (FOV) and vertical FOV of several tens of degrees.

To reduce the amount of optical power required for interrogating a detection region, some LiDAR systems employ a receiver that is based on Geiger-mode avalanche photodiodes (GmAPDs). A GmAPD is a special type of avalanche photodiode (APD), referred to as a single-photon detector (SPAD), that has such high sensitivity that it can detect the receipt of a single photon of light. To sample the detection region, the GmAPD is operated in "gated mode," in which it is put into "Geiger mode" (i.e., "armed") by biasing it at a voltage level above its breakdown voltage. When biased above this voltage, the absorption of a single photon gives rise to the generation of a single charge-carrier pair that induces the SPAD to spontaneously generate an avalanche current that is macroscopically detectable. At the end of the gating period, the SPAD is "disarmed" by reducing its bias voltage below its breakdown voltage, which quenches the avalanche current enabling the SPAD to be rearmed to detect the arrival of another photon. GmAPD-based LiDAR systems can have several advantages over other LiDAR systems, including higher sensitivity, smaller size, weight, and electrical power requirements. As a result, GmAPD-based LiDAR is particularly well suited for airborne mapping and surveillance applications, such as low-altitude foliage penetrating LiDAR. Examples of GmAPD-based LiDAR systems are described by Clifton, et al., in "Medium Altitude Airborne Geiger-mode Mapping LiDAR System," Proc. of SPIE, Vol. 9465, pp. 946506-1-946506-8 (2015), as well as by Niclass, et al., in "Design and Characterization of a 256×64-pixel single-photon imager in CMOS for a MEMS-based laser scanning time-of-flight sensor," Optics Express, Vol. 20, pp. 11863-11881 (2012), each of which is incorporated herein by reference.

In a typical prior-art GmAPD-based LiDAR system, the distribution of objects within the detection region (a.k.a., a "point-cloud image") is generated in an image frame that includes a sequence of many detection frames. In each detection frame of the image frame, the same view of the detection region is scanned by interrogating it with an optical pulse and detecting the reflections of that pulse. Statistical methods are usually applied to the results obtained through the sequence of detection frames to mitigate the impact of noise. The start time of each detection frame is defined by the transmission of its respective optical pulse. At a time based on a priori knowledge of the distance between the transmitter and the beginning (i.e., closest point) of the detection region, the GmAPD is placed in Geiger mode (i.e., is "armed") to enable it to detect a single photon. The GmAPD is gated such that it remains in Geiger mode for a period of time that is based on how long it takes for the optical pulse to transit the entire range of the detection region. At the end of the detection frame, which corresponds to a time based on the maximum range of the detection region, the GmAPD is taken out of Geiger mode (i.e., is "disarmed") to disable its detection of a single photon. In other words, the GmAPD is operated in gated mode using a gating signal that enables it to selectively sample the entire range of the detection region in each detection frame.

The requirements for a LiDAR system used in automotive applications are quite challenging. For instance, the system needs to have a large FOV in both the horizontal and vertical directions, where the FOV is supported over a distance that ranges from a few centimeters to hundreds of meters (e.g., 300 m or more). Further, the system must have high resolution, as well as an ability to accommodate a changing environment that surrounds a vehicle that might be travelling at relatively high speed. As a result, the system needs to be able to update the simulated environment around the vehicle at a high rate. In addition, an automotive LiDAR system needs to operate with a high signal-to-noise ratio (SNR) over a wide range of ambient light conditions (e.g., daytime, nighttime, foggy, rainy, etc.) and over its entire operating distance (i.e., scan range).

Unfortunately, in both Gm-APD-based LiDAR systems and non-Geiger-mode LiDAR systems, SNR degrades with range (i.e., distance through the detection zone). As a result, approaches to mitigate noise are typically necessary. For example, as discussed above, an image frame in which an image of the detection region is generated will include the repetition of many detection frames of the same view. Statistical methods, such as averaging, thresholding, etc., are then applied to the output signals generated during these multiple detection frames to reduce the impact of noise (e.g., detection of solar-generated photons, spurious dark counts generated internally to the SPAD, etc.) that can reduce the SNR of the resultant image. Such approaches give rise to undesirable latency that degrades system performance, however.

The need for a low-cost, high-performance LiDAR system having high SNR throughout its scan range remains unmet in the prior art.

SUMMARY OF THE INVENTION

The present invention enables a LiDAR system without some of the costs and disadvantages of the prior art. The present invention enables GmAPD-based LiDAR systems having improved noise performance across the entire range of a detection region by sampling the detection region non-uniformly through its range. Embodiments of the present invention are particularly well-suited for use in applications such as autonomous vehicles, adaptive automotive cruise control, collision-avoidance systems, video-game controllers, virtual- and augmented-reality systems, and the like.

In the prior-art, GmAPD-based LiDAR systems generate a point-cloud image of a detection region by scanning the entire detection region many times and forming a composite image from the results of the plurality of scans. Each scan is performed during a different one of a sequence of substantially identical detection frames of an image frame from which the point-cloud image is generated. In each detection frame, an optical pulse is transmitted into the sample region and a GmAPD-based receiver is gated to enable it to detect photons reflected from anywhere within the detection region. A gating signal puts the GmAPD-based pixels of the receiver into Geiger-mode operation by arming them at a time corresponding to the initial range of the detection region and disarming them at a second time corresponding to the maximum range of the detection region.

Like the prior art, embodiments of the present invention generates an image of a detection region by repeatedly scanning it during a sequence of detection frames that collectively define an image frame and, in each detection frame, interrogates the detection region with an optical pulse. In contrast to the prior art, however, the detection frames are not substantially identical through their sequence. Instead, GmAPD-based pixels of the receiver are gated such that the detection region is sampled non-uniformly through the sequence of detection frames. Preferably, the receiver pixels are gated with a gating signal that arms the SPADs of the pixels such that, in the first detection frame of the image frame, they begin sampling the detection region only in a detection zone that begins at an initial range near the maximum range of the detection region. In each subsequent detection frame of the image frame, the initial range at which the SPADs are armed progresses closer toward the receiver such that each subsequent detection zone sampled increasingly includes more of the shorter range regions of the detection region. As a result, the present invention enables longer-range areas of the detection region to be sampled more times during the image frame than shorter-range areas. In some embodiments, the initial range at which the SPADs are armed progresses further into the detection region with each subsequent detection frame of the image frame.

In an illustrative embodiment, a point cloud image is generated for a detection region during an image frame comprising a sequence of detection frames. In each detection frame an optical pulse is transmitted toward the detection region and a gating signal is provided to a receiver that includes a GmAPD-based focal-plane array. During a gating period in each detection frame, the receiver is armed to enable it to sample the detection region, while the receiver is disabled during the remainder of the detection frame. In each detection frame, the gating signal arms the receiver after a gate delay and disarms the receiver at a time based on the maximum range of the detection region, where the magnitude of the gate delay begins as nearly equal to the duration of the detection frame in the first detection frame of each image frame and decreases linearly through the sequence of detection frames. As a result, the number of times a portion of the detection region is sampled during an image frame increases linearly with range. By virtue of the linear increase in the number of samples with respect to range, SNR is more uniform through the entire scan range of the detection region. In some embodiments, the magnitude of the gate delay begins as nearly zero in the first detection frame of each image frame and increases linearly through the sequence of detection frames.

In some embodiments, the magnitude of the gate delay increases or decreases non-linearly through the sequence of detection frames. In some embodiments, the gate delay changes exponentially through the sequence of detection frames. In some embodiments, the magnitude of the gate delay changes according to a power-law function through the sequence of detection frames. In some embodiments, the magnitude of the gate delay changes according to a polynomial function through the sequence of detection frames. In some embodiments, the magnitude of the gate delay changes based on a random- or quasi-random-number-based function through the sequence of detection frames. In some embodiments, at least two detection frames have the same gate delay.

An embodiment of the present invention is a method for determining the location of an object within a detection region, the method comprising: transmitting a first optical signal toward the detection region, wherein the first optical signal comprises an optical pulse train having a first periodicity; providing a receiver including at least one single-photon detector; establishing a sequence of detection frames having substantially uniform duration, each detection frame having a start time and a stop time, wherein the sequence of detection frames defines a first image frame; and establishing a gating period within each detection frame of the sequence thereof, wherein the receiver is enabled to detect a single photon received from the detection region only during the gating period; wherein the transmission of each optical pulse of the optical pulse train defines the start time of a different detection frame of the sequence thereof; wherein each detection frame of the sequence thereof is characterized by a gate delay between its respective start time and its respective gating period; and wherein the gate delays of the plurality thereof are non-uniform.

Another embodiment of the present invention is a method for generating a point-cloud image of a detection region, the method comprising: providing a light detection and ranging (LiDAR) system such that the LiDAR system comprises a transmitter and a receiver comprising at least one single-photon detector, wherein the transmitter is operative for transmitting a first optical signal comprising an optical-pulse train having a first periodicity; transmitting the first optical signal toward the detection region; establishing a sequence of detection frames having substantially uniform duration, each detection frame having a start time that is based on the transmission of a different optical pulse of the optical-pulse train thereof, wherein the sequence of detection frames defines a first image frame; establishing a plurality of sample regions having non-uniform size, wherein the detection region includes each of the plurality of sample regions; and for each detection frame of the sequence thereof, enabling the receiver to detect a second optical signal received from only a different sample region of the plurality thereof.

Yet another embodiment of the present invention is a light detection and ranging (LiDAR) system for estimating a point-cloud image of a detection region, the system comprising: a transmitter that is operative for transmitting a first optical signal comprising an optical-pulse train having a first periodicity, the optical-pulse train comprising a plurality of optical pulses; a receiver comprising at least one single-photon detector; and a processor operative for providing a gating signal to the receiver, the gating signal including a sequence of detection frames having substantially uniform duration, wherein each detection frame of the plurality thereof has a start time based on the transmission of a different optical pulse of the optical-pulse train thereof, and wherein each detection frame of the plurality thereof includes a gate delay and a gating period; wherein the receiver is enabled to detect a single photon only during the plurality of gating periods; and wherein the plurality of gate delays is non-uniform.

BRIEF DESCRIPTION OF THE DRAWINGS

FIGS. 10A and 10B depict plots of SNR versus distance through a 200-m long detection region for a prior-art LiDAR system and a LiDAR system in accordance with the present invention, respectively.

DETAILED DESCRIPTION

The following terms are defined for use in this Specification, including the appended claims:

detection region is defined as the region of interest that is imaged during an image frame;

image frame is defined as a time period during which a detection region is imaged. An image frame typically includes a plurality of detection frames;

detection frame is defined as the time period between transmission of optical pulses from a transmitter;

gate delay is defined as the time difference between the start time of a detection frame and the time at which a GmAPD-based receiver is armed to put it into Geiger mode;

gating period is defined as the period of time within a detection frame that a SPAD is armed to enable detection of a single photon of light; and sample region is defined as the region within a detection region that is sampled during an individual detection frame.

Figure 1A:
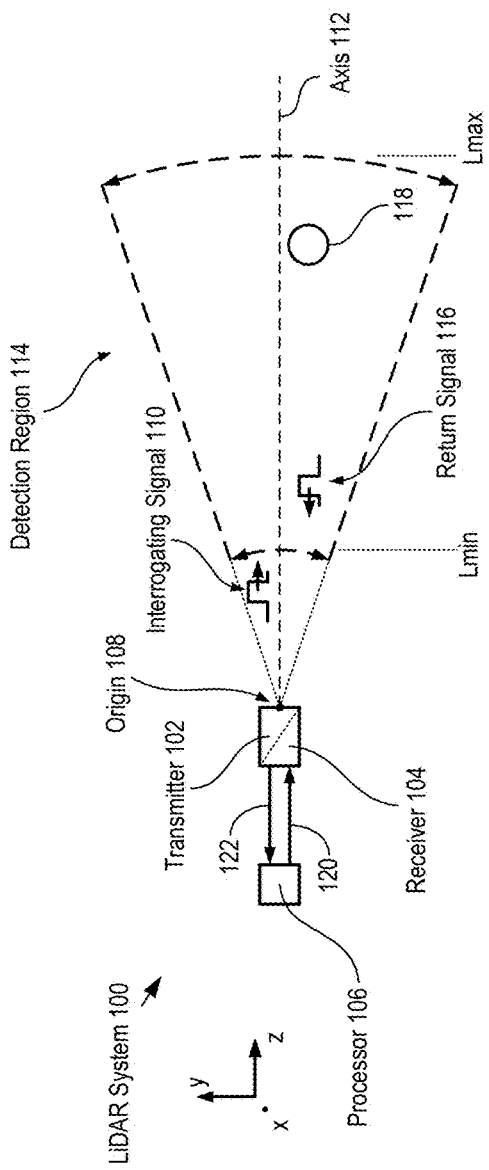
FIGS. 1A-B depict schematic drawings of top and side views, respectively, of a GmAPD-based LiDAR system in accordance with the prior art.
Figure 1B:
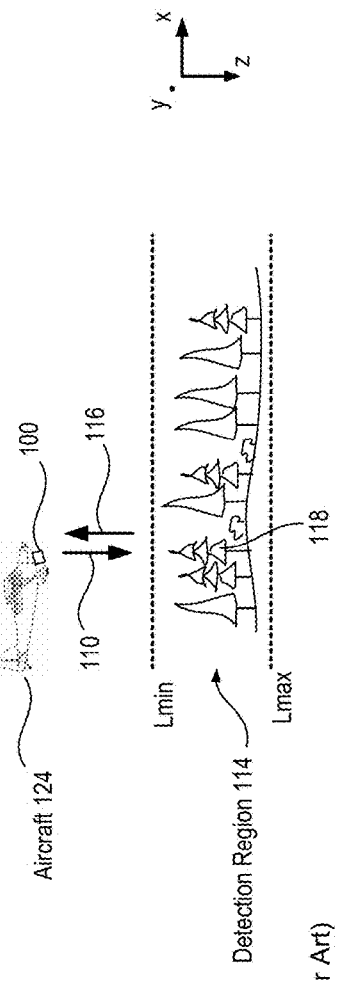

FIGS. 1A-B depict schematic drawings of top and side views, respectively, of a GmAPD-based LiDAR system in accordance with the prior art. System 100 includes transmitter 102, receiver 104, and processor 106. System 100 is mounted on aircraft 124 and is representative of a conventional aircraft-mounted LiDAR system for airborne mapping and surveillance applications.

To image detection region 114, transmitter 102 transmits periodic interrogating signal 110 and receives return signal 116. Interrogating signal 110 and return signal 116 are transmitted and received along axis 112, which is aligned with the z-direction as shown. Interrogating signal 110 is an optical-pulse train having period T1, whose optical pulses have a wavelength and intensity suitable for interrogating detection region 114. The wavelength of interrogating signal 110 is normally within the range of 900 nm to approximately 2000 nm; however, other wavelengths are also known in the prior art. Typically, transmitter 102 includes a laser source, such as a diode laser, which emits the optical pulses of interrogating signal 110 in response to a drive signal from processor 106.

As each optical pulse of interrogating signal 110 propagates through detection region 114, objects (such as tree 118) reflect a portion of the optical energy of the pulse back toward system 100 as a reflected optical pulse in return signal 116, which is detected at receiver 104.

Receiver 104 is a single-photon imager comprising an imaging lens and a focal-plane array of GmAPD detector pixels. When each pixel is armed, it can detect a low-intensity reflection of an optical pulse and provide a commensurate output signal 122 to processor 106.

Transmitter 102 and receiver 104 are arranged such that the illumination pattern of the transmitter and the field of view of the receiver overlap (i.e., the transmitter covers the field of view of the receiver) and include detection region 114, which has a scan range that extends from Lmin to Lmax.

Processor 106 provides a drive signal to transmitter 102 to control its emission of interrogating signal 110. Processor 106 also provides gating signal 120 to the pixels of receiver 104 that enables them to selectively detect photons received from the detector region.

Figure 2:
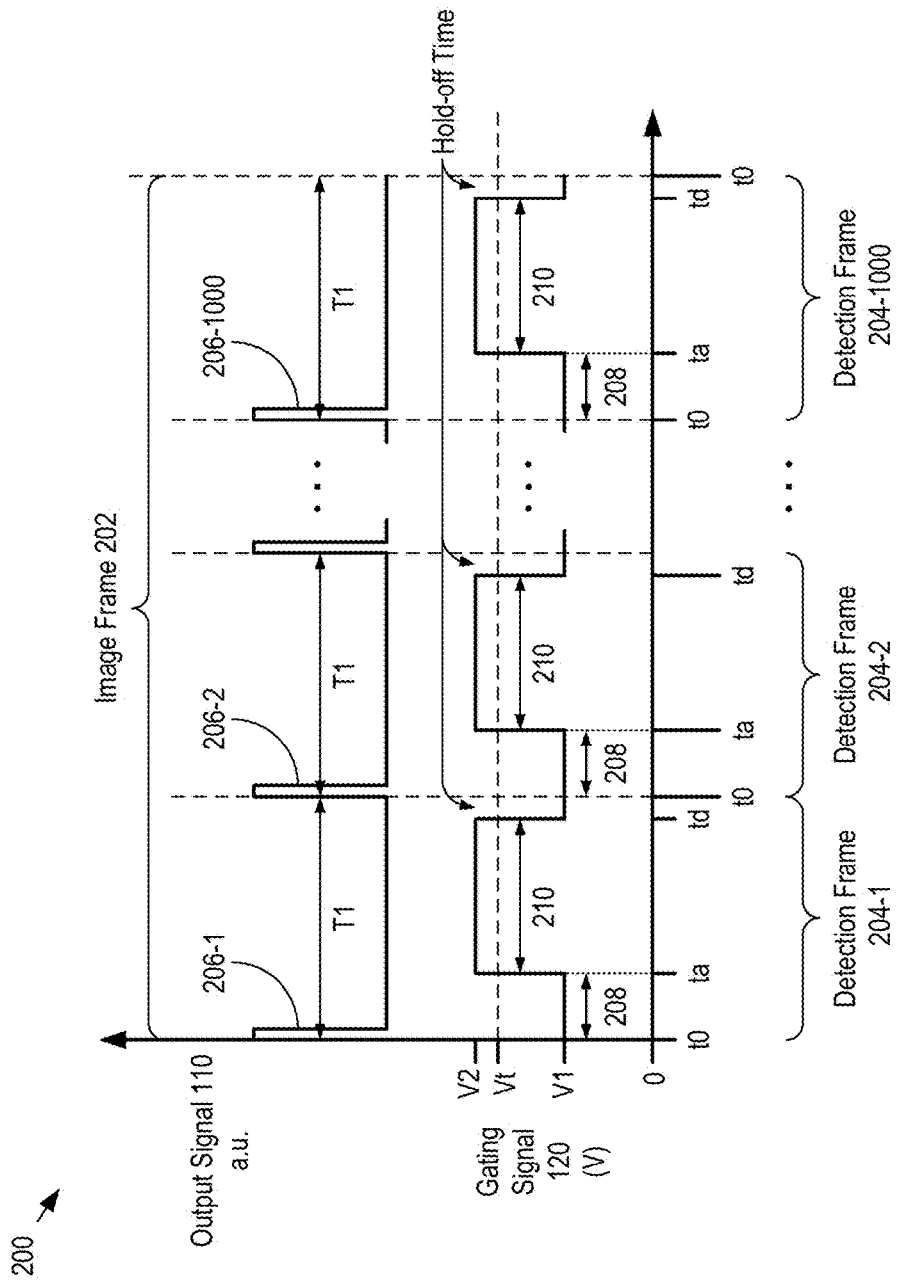
FIG. 2 depicts a timing diagram of a representative image frame for imaging detection region 114 in accordance with system 100.

FIG. 2 depicts a timing diagram of a representative image frame for imaging detection region 114 in accordance with system 100. In the depicted example, image frame 202 includes 1000 substantially identical detection frames 204. Each of detection frames 204 has the same duration, which is equal to the period, T1, of the optical-pulse train of interrogating signal 110.

In image frame 202, each of detection frames 204-1 through 204-1000 (referred to, collectively, as detection frames 204) has a start time, t0, which is based on the transmission of an optical pulse 206 of interrogating signal 110. In the depicted example, start time t0 is synchronized to the transmission of its respective optical pulse. For example, optical pulse 206-1 is emitted at time t0 of detection frame 204-1, optical pulse 206-2 is emitted at time t0 of detection frame 204-2, and so on. In some embodiments, the start time of each detection frame is different than the transmission time of its respective optical pulse.

At arming time ta, gating signal 120 raises the bias voltage applied to the GmAPD-based pixels of receiver 104 from V1 to V2, where V2 is a voltage higher than their threshold voltage, Vt. This puts the pixels into Geiger mode, thus arming them to enable each pixel to detect receipt of a single photon of light. Arming time ta occurs at the end of gate delay 208. The magnitude of gate delay 208 is based on the distance between aircraft 124 (i.e., system 100) and the beginning of detection region 114 (i.e., Lmin). It should be noted that, in many applications (e.g., autonomous vehicles, automobile LiDAR, etc.), the region of interest is immediately adjacent to system 100, thus Lmin is at origin 108 and gate delay 208 is equal to zero (i.e., ta and t0 are the same time).

Gating signal 120 remains high (i.e., at V2) throughout gating period 210, which ends at disarming time td, when it is reduced below threshold voltage Vt to voltage V1. The time between ta and td (i.e., the duration of the gating period) defines the extent (i.e., range) of the sample region that is scanned during each detection frame. This stops any avalanche events occurring in the GmAPDs of receiver 104 (i.e., avalanche currents are quenched), enabling the GmAPDs to be rearmed to detect the arrival of another photon during the next detection frame. Disarming time td is based on the time of flight for a photon from the longest range within the field of interest (i.e., maximum range, Lmax, of detection region 114) to receiver 104. As a result, the range within detection region 114 sampled by receiver 104 (i.e., the sampling range) extends through the entire detection region (i.e., from Lmin to Lmax). One skilled in the art will recognize that, typically, the pixels of receiver 104 are disarmed slightly before the end of each detection frame (as shown in FIG. 2), thereby defining a hold-off time during which any trapped charges in the GmAPDs can detrap and recombine while the GmAPD is not in Geiger mode. This avoids spurious avalanche events, such as dark counts due to afterpulsing.

It should be noted that, in the prior art (e.g., the example depicted in FIGS. 1 and 2), receiver 104 is gated such that gating period 210 is uniform throughout the entire sequence of detection frames 204. As a result, the sampling range sampled by receiver 104 (i.e, the entirety of detection region 114) is also uniform through the sequence of detection frames. Unfortunately, sampling a sampling region containing the entire detection region in every detection frame gives rise to several significant drawbacks for prior-art GmAPD-based LiDAR systems.

First, more laser signal photons are reflected to receiver 104 from objects located nearer system 100, which blinds the GmAPD detector pixels for the bulk of each detection frame.

Second, the probability of a spurious noise event (e.g., a dark count or receipt of a solar-generated photon, etc.) increases with time according to the exponential function: $P_{noise}=(1-e^{-Nt})$, where the N is the rate at which noise events occur (e.g., receipt of solar-generated photons, dark counts, etc.) and t is time. As a result, the probability of being able to detect a reflected photon decreases with time according to the exponential function: $P_{detection}=(e^{-Nt})$.

Third, the solar flux reflected from an object in detection region 114 is linearly dependent on its surface reflectivity (assuming non-perfect scattering surfaces). Objects that are more reflective, therefore, will tend to blind the GmAPD pixels of receiver 104 faster than lower-reflectivity objects. To mitigate this effect, some prior-art LiDAR systems attenuate received light; however, this mitigation approach undermines the ability to image objects having low reflectivity.

As a result, SNR in prior-art GmAPD-based LiDAR systems, such as system 100, is heavily weighted toward low-reflectivity objects in the short-range areas of detection region 114.

Figure 3:
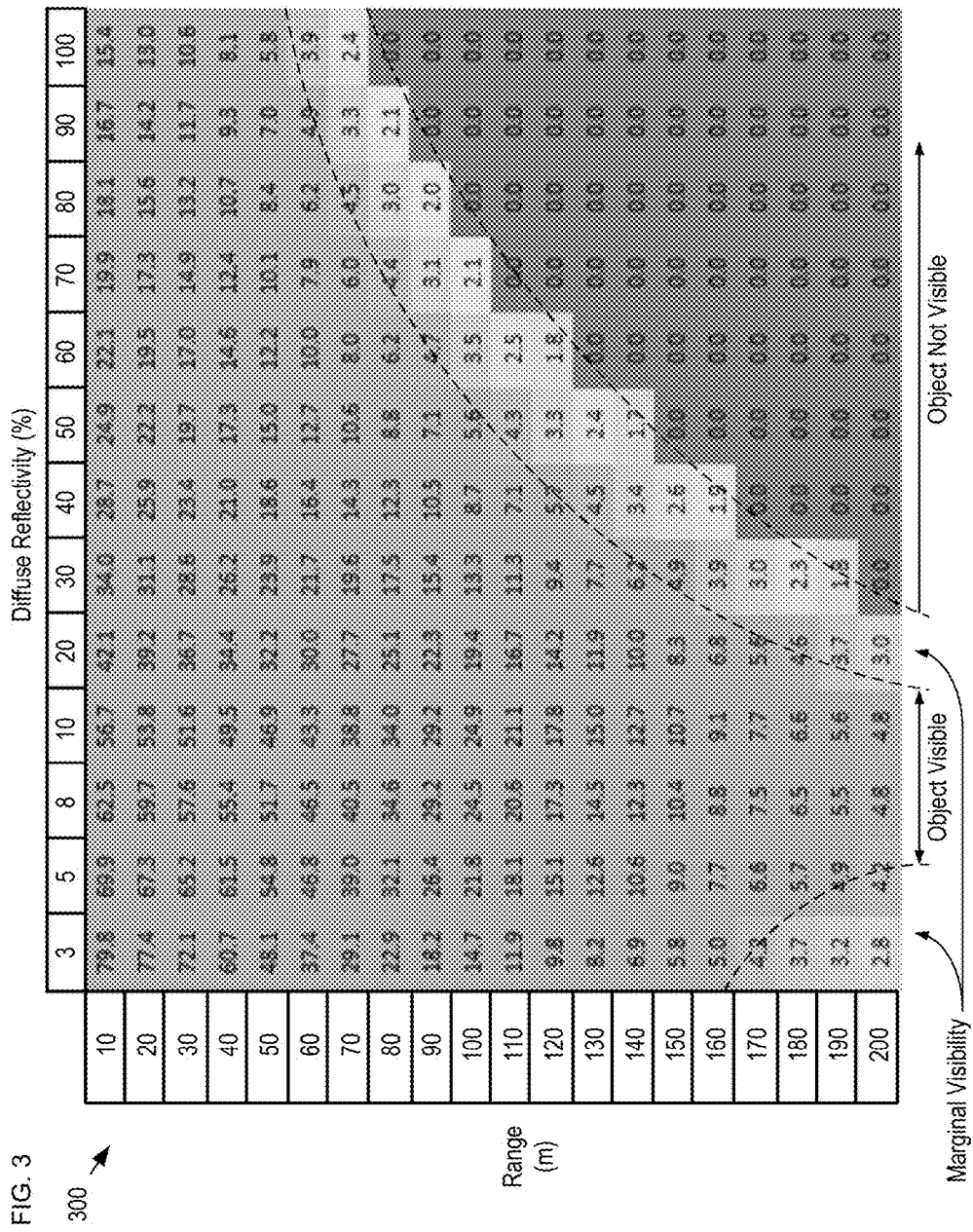
FIG. 3 depicts a simulated plot of SNR with respect to range and reflectivity for system 100.

FIG. 3 depicts a simulated plot of SNR with respect to range and reflectivity for system 100. Plot 300 is based on a system employing zero gate delay and having an image frame that includes 160 detection frames.

Based on a minimum acceptable value of SNR of 2, plot 300 shows that as the reflectivity of an object increases above 20%, the range at which it can be detected begins to drop off sharply from 200 meters to only about 70 meters for 100% reflectivity. This significantly detracts from the utility of prior-art GmAPD-based LiDAR systems for many applications.

It is an aspect of the present invention that the application of a non-uniform gating period across the sequence of detection frames in an image frame enables a detection region to be imaged with sufficient SNR over its entire scan range such that objects throughout the entire detection region can be detected with high confidence. By applying a gate delay whose magnitude changes through the sequence of detection frames, sample weighting can be tailored to sacrifice SNR in areas of the detection region where it is higher than necessary to detect objects while improving SNR in areas where objects would otherwise not be visible. In other words, embodiments of the present invention enable sampling of some areas of the detection region more times than other areas of the detection region within a single image frame. For example, because short-range objects reflect more photons back to a LiDAR receiver than longer-range objects, short-range objects are detected with significantly higher SNR than longer-range objects. As a result, short-range areas of the detection region are sampled fewer times and longer-range areas are sampled more times within an image frame to achieve an SNR sufficient for high-confidence object detection across the entire scan range of the detection frame. Further, the present invention mitigates the need to increase the duration of an image frame to attain a minimum acceptable value of SNR in longer-range areas of a detection region, thereby avoiding increased the image blur and latency associated with long image acquisition times.

Figure 4:
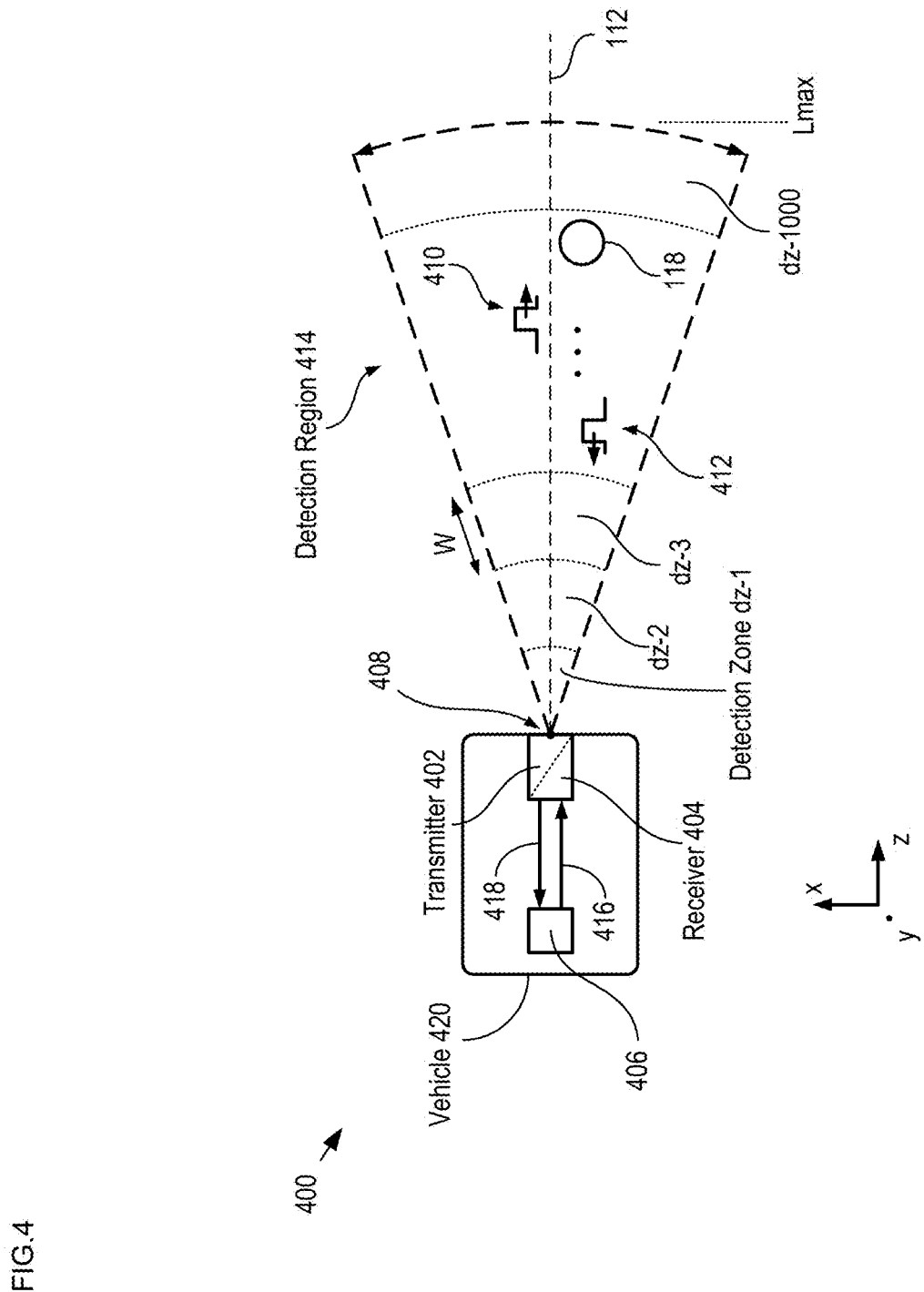
FIG. 4 depicts a schematic drawing of a top view of a GmAPD-based LiDAR system in accordance with an illustrative embodiment of the present invention.

FIG. 4 depicts a schematic drawing of a top view of a GmAPD-based LiDAR system in accordance with an illustrative embodiment of the present invention. System 400 includes transmitter 402, receiver 404, and processor 406. System 400 is mounted on automobile 420. System 400 is operative for imaging a detection region with high SNR through the entire scan range along axis 112 from origin 408 to Lmax.

Figure 5:
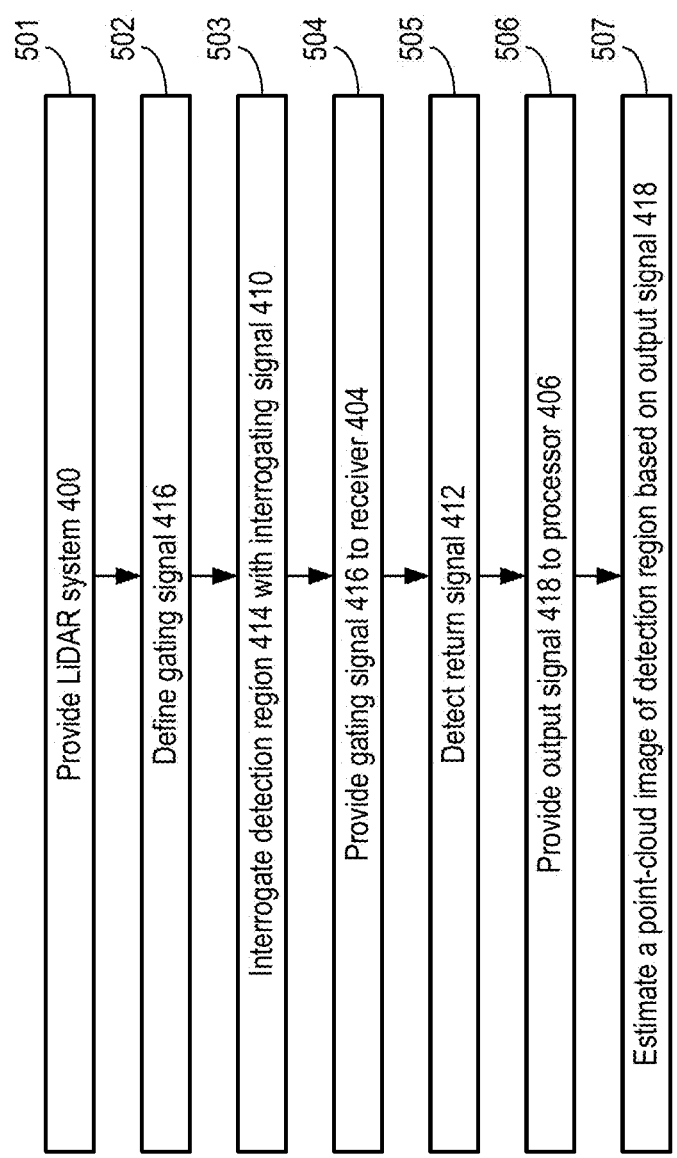
FIG. 5 depicts operations of a method for imaging a detection region in accordance with the illustrative embodiment.

FIG. 5 depicts operations of a method for imaging a detection region in accordance with the illustrative embodiment. Method 500 begins with operation 501, wherein LiDAR system 400 is provided.

Transmitter 402 is a conventional LiDAR transmitter comprising a laser that is operative for emitting interrogating signal 410 such that it propagates along axis 112, which is aligned with the z-direction as shown, while fanning out in the x- and y-directions to define a "cone-shaped" detection region. In the depicted example, interrogating signal 410 comprises a periodic optical-pulse train comprising a sequence of optical pulses, which is suitable for interrogating detection region 414. The optical pulses of interrogating signal 410 are emitted at a frequency of approximately 30 KHz and, therefore, have are periodic with a uniform period, T2, of approximately 33.3 microseconds. In some embodiments of the present invention, transmitter 402 emits an optical pulse train having a different frequency.

Receiver 404 is a single-photon imager comprising an imaging lens and a focal-plane array of GmAPD detector pixels. Receiver 404 is analogous to receiver 104 described above. When each pixel is armed, it can detect a low-intensity reflection of an optical pulse and provide a commensurate output signal 418 to processor 406. In some embodiments, receiver 404 includes a single SPAD whose field of view is scanned over at least one dimension of the detection region. In some embodiments, receiver 404 includes an arrangement of SPADs other than a focal-plane array, wherein the fields of view of the SPDs are collectively scanned over at least one dimension of the detection region.

Transmitter 402 and receiver 404 are dimensioned and arranged such that the illumination pattern of the transmitter and the field of view of the receiver overlap to encompass the entirety of detection region 414.

The longitudinal and lateral extent of detection region 414 is defined by the optics of transmitter 402 and receiver 404, the optical power of the optical pulses emitted by transmitter 402, and the SNR of system 400, among other factors.

Processor 406 is analogous to processor 106 described above; however, processor 406 has the additional capability of defining a function for controlling the gate delay applied through the sequence of detection frames in an image frame, such that the gate delay and gating period are controlled on a detection-frame-by-detection-frame basis.

At operation 502, gating signal 416 is defined. Gating signal 416 is operative for imaging detection region 414 with an SNR that exceeds a user-defined minimally acceptable level across the entire scan range of the detection region. In the depicted example, gating signal 416 enables imaging of the entirety of detection region 414 with an SNR greater than or equal to 2. As a result, system 400 can detect objects anywhere in the detection region with a high degree of confidence.

As discussed below, gating signal 416 controls the voltage bias applied to the GmAPD-based detector pixels of receiver 404 over the entire duration of an image frame. Gating signal 416 is defined to arm and disarm the pixels of the receiver in a manner that samples detection region 414 non-uniformly through the sequence of detector frames. In the depicted example, gating signal 416 controls receiver such that the number of times the receiver samples an area of detection region 414 increases linearly with the distance of that area from system 400 (i.e., its range within detection region 414). A linear gate-delay progression mitigates the effects of noise by emphasizing the sampling of objects at longer range within the detection region.

At operation 503, transmitter 402 interrogates detection region 414 with interrogating signal 410.

At operation 504, gating signal 416 is provided to receiver 404.

Figure 6:
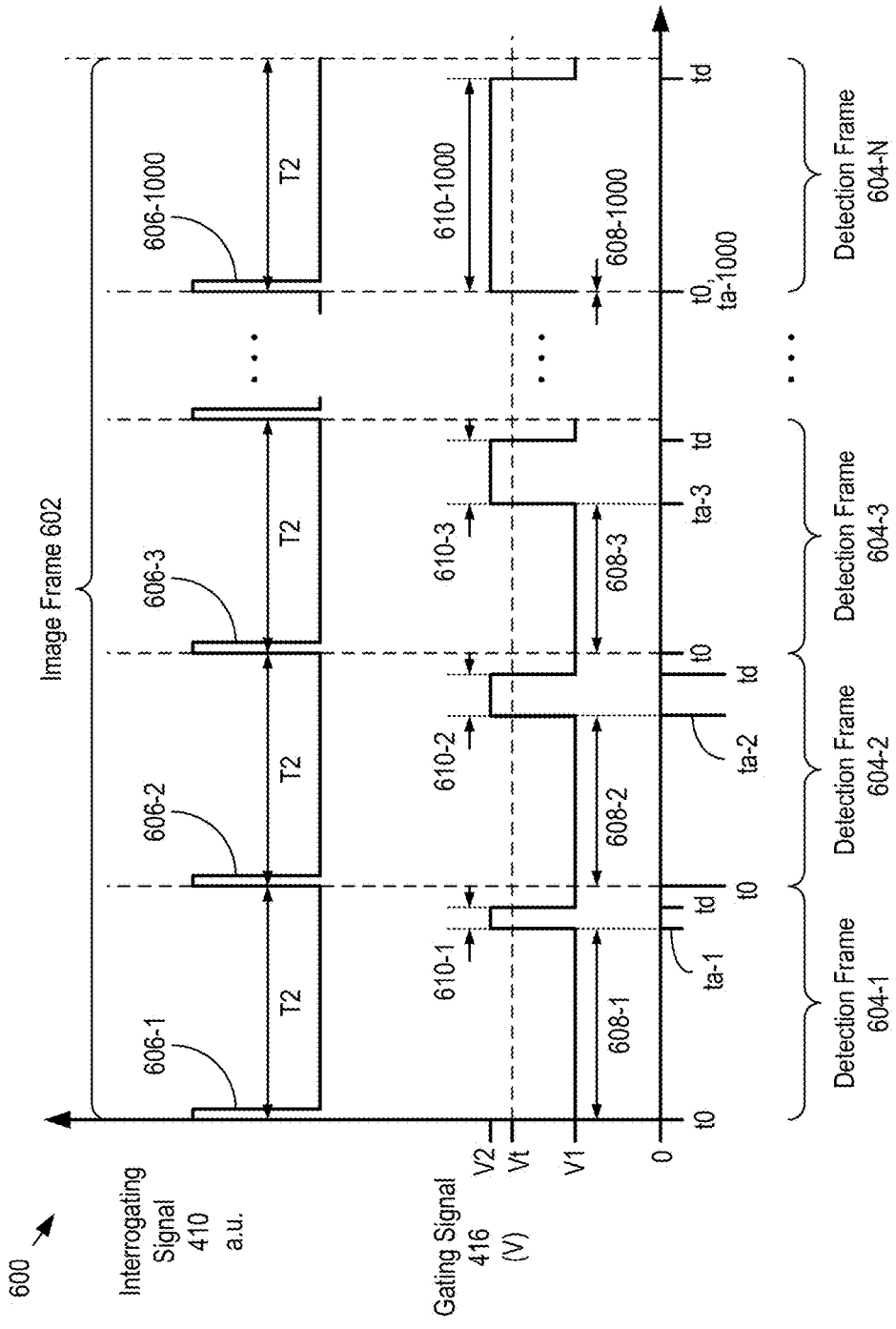
FIG. 6 depicts a timing diagram of an image frame in accordance with the illustrative embodiment.

FIG. 6 depicts a timing diagram of an image frame in accordance with the illustrative embodiment. In the depicted example, image frame 602 includes a sequence of 1000 consecutive detection frames 604-1 through 604-1000 (referred to, collectively, as detection frames 604). One skilled in the will recognize that the number of detection frames included in an image frame is a matter of design choice and is based on many factors, such as required SNR, required image frame rate, vehicle speed, environmental conditions, required maximum object blur, and the like. Although image frame 602 includes 1000 detection frames 604, it will be clear to one skilled in the art, after reading this Specification, that that any practical number of detection frames can be included in an image frame without departing from the scope of the present invention.

Interrogating signal 410 includes an optical-pulse train comprising optical pulses 606-$i$, where 1≤$i$≤1000, where the optical pulses are emitted periodically with period T2. For each value of i, the transmission of optical pulse 606-$i$ defines start time t0 for detection frame 604-$i$. The stop time for detection frame 604-$i$ is defined by the transmission of the next optical pulse in the optical-pulse train of interrogating signal 410 (i.e., optical pulse 606-($i$+1)). As a result, the duration of detection frame 604-$i$ is substantially equal to the period, T2, of interrogating signal 410.

Gating signal 416 establishes gating period 610-$i$ for each detection frame 604-$i$. Gating period 610-$i$ begins at arming time ta-i and ends at disarming time td. At arming time ta-i, the magnitude of gating signal 416 is increased above the threshold voltage, Vt, of the GmAPD pixel elements of receiver 404. It should be noted that arming time ta-i is detection-frame-dependent, in contrast to the prior art. At disarming time td, the magnitude of gating signal 416 is reduced back below Vt to quench the pixels of receiver 404. Since disarming time td is uniform across the sequence of detection frames, the duration of gating period 610-$i$ is determined by the magnitude of detection-frame-dependent gate delay 608-$i$.

The duration of gate delay 608-$i$ defines the range in detection region 414 at which sampling begins during detection frame 604-$i$. The range at which sampling ends (i.e., the maximum depth sampled) is determined by disarming time td. In the depicted example, the maximum depth sampled is uniform across detection frames 604 and is based on the maximum range, Lmax, in detection region 414. Gating period 610-$i$, therefore, is the portion of detection frame 604-$i$ between times ta-i and td.

The magnitude of gate delay 608-$i$ is controlled by processor 406 such that it is non-uniform through the sequence of detection frames 404. It should be noted that this is in contrast to prior-art system 100, in which receiver 104 is gated such that gate delay 208 and gating period 210 are uniform throughout the entire sequence of detection frames in image frame 202. In the depicted example, gate delay 608-$i$ is controlled such that its magnitude decreases according to a step-wise linear function through the sequence of detection frames in image frame 602. For the purposes of this Specification, including the appended claims, the definition of the term "linear function" includes both smooth linear functions and piece-wise linear functions. Since the disarming time td remains constant for all detection frames 604, the duration of gating period 610-$i$ increases in linear fashion through the sequence of detection frames (i.e., as i increases).

Figure 7:
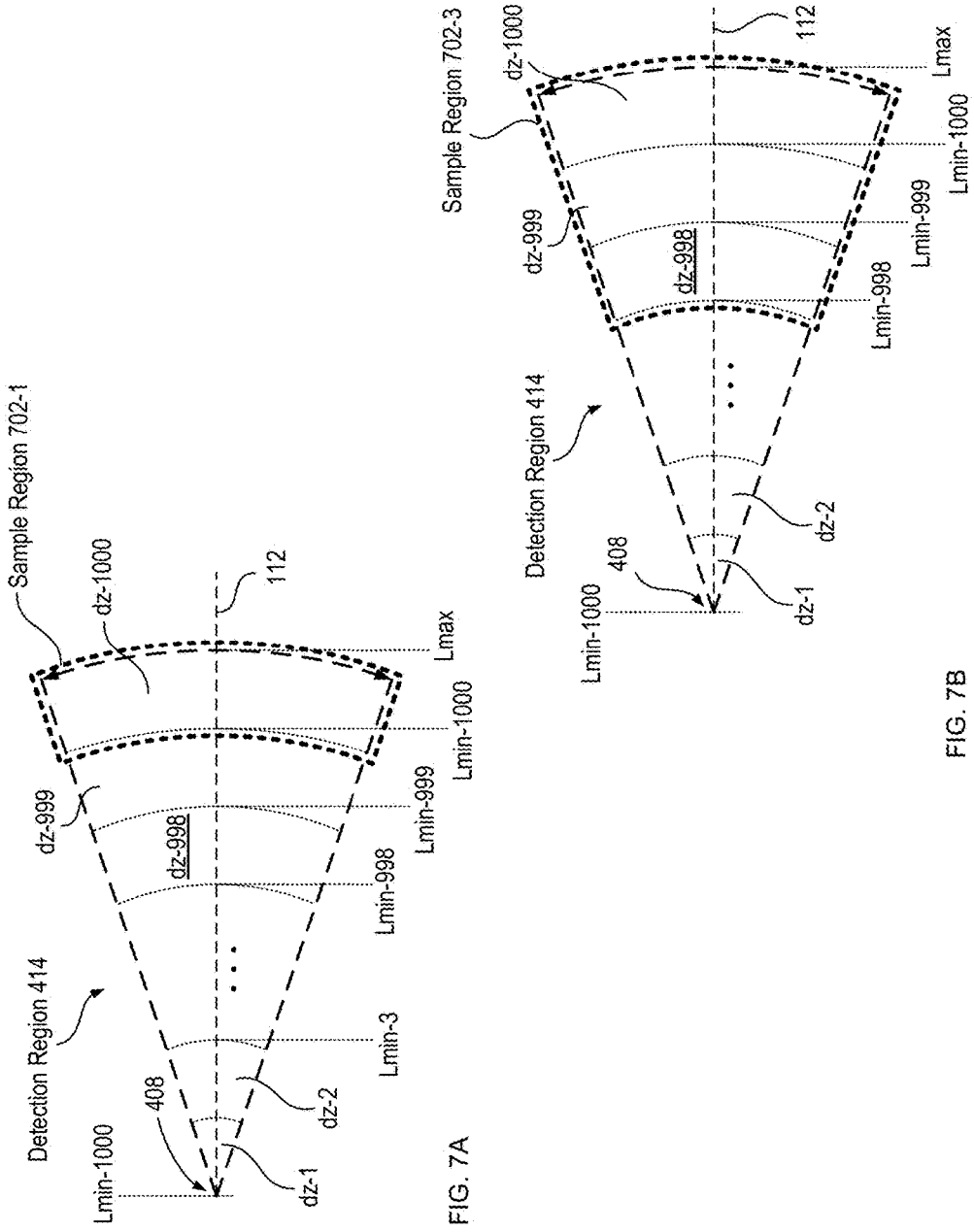
FIGS. 7A and 7B depict exemplary sample regions scanned during two different detection frames of image frame 602.

FIGS. 7A and 7B depict exemplary sample regions scanned during two different detection frames of image frame 602. Sample region 702-1 shows the sample region scanned during detection frame 604-1 and sample region 702-3 shows the sample region scanned during detection frame 602-3. FIGS. 7A-B are described with continuing reference to FIGS. 4 and 6.

The piecewise linear nature of the change in gate delay 608 manifests as a separation of detection region 414 into a plurality of detection zones, dz-1 through dz-1000. The scan range, W, of each detection zone is based on the distance traveled by a photon during a time period equal to the difference between the gate delays of sequential detection periods. In the depicted example, the gate delays change at a uniform rate; therefore, the scan range of each of detection zones dz-1 through dz-1000 is W.

Each of sample regions 702-$i$ begins at its initial range, Lmin-(1001-$i$), which is based on the magnitude of gate delay 608-$i$. Lmin-(1001-$i$) is the beginning of detection zone dz-(1001-$i$) and is based on the distance traveled by a photon during gate delay 608-$i$ from origin 408 to the beginning of that detection zone. For a gating signal defined by a step-wise linear function, the gate delay is given by the generalized formula:

$$\frac{(N-i)}{N} * (td - t0), \quad (1)$$

where N is equal to the number of detection frames in an image frame. Using equation (1) the duration of the corresponding gating period is given by the generalized formula:

$$\frac{i}{N} * td. \quad (2)$$

For the depicted example, N=1000 and t0=0; therefore, equations (1) and (2) reduce to:

$$\frac{(1000-i)}{1000} * (td), \text{ and} \quad (3)$$

$$\frac{(td) * i}{1000}. \quad (4)$$

The scan range of sample region 702-$i$ ends at Lmax and is based on the distance traveled by a photon during the duration of gating period 610-$i$. As a result, sample region 702-$i$ includes the (1001-$i$) detection zones that lie between Lmin-(1001-$i$) and Lmax.

In detection frame 604-1, for example, gate delay 608-1 is equal to (999/1000)*(td) (i.e., arming time ta-1 is (999/1000)*(td)) and the duration of gate period 610-1 is equal to (1/1000)*td. Sample region 702-$i$, therefore, includes only detection zone dz-1000. In successive detection frames, the magnitude of gate delay 608-$i$ decreases by 1/1000th of the detection-frame duration. For detection frame 608-3, therefore, gate delay 608-3 is equal to (997/1000)*(td), the duration of gate period 610-3 is (3/1000)*td, and sample region 702-3 includes detection zones dz-998 through dz-1000. In similar fashion, for detection frame 608-1000, gate delay 608-1000 is equal to zero (i.e., gating signal 416 is increased from V1 to V2 at start time t0) and gating period 610-1000 is analogous to gating period 210, as described above, while sample region 702-1000 includes the entirety of detection region 414 (i.e., all of detection zones dz-1 through dz-1000).

Because Lmin-$i$ moves toward origin 408 by distance, W, in each successive detection frame but Lmax remains constant, the region sampled grows to include an additional shorter range detection zones with each increment of i. As a result, the number of times a detection zone is sampled during image frame 602 is proportional to its distance from origin 408. For example, detection zone dz-1000 is sampled during every one of the one thousand detection frames of image frame 602 and detection zone dz-998 is sampled in all but two of the one thousand detection frames, but the shortest range detection zones are sampled only a few times during each image frame. Detection zone dz-3, for instance, is sampled during only the last three detection frames of image frame 602, while detection zone dz-1 is sampled only once, during detection frame 608-1000.

Figure 8:
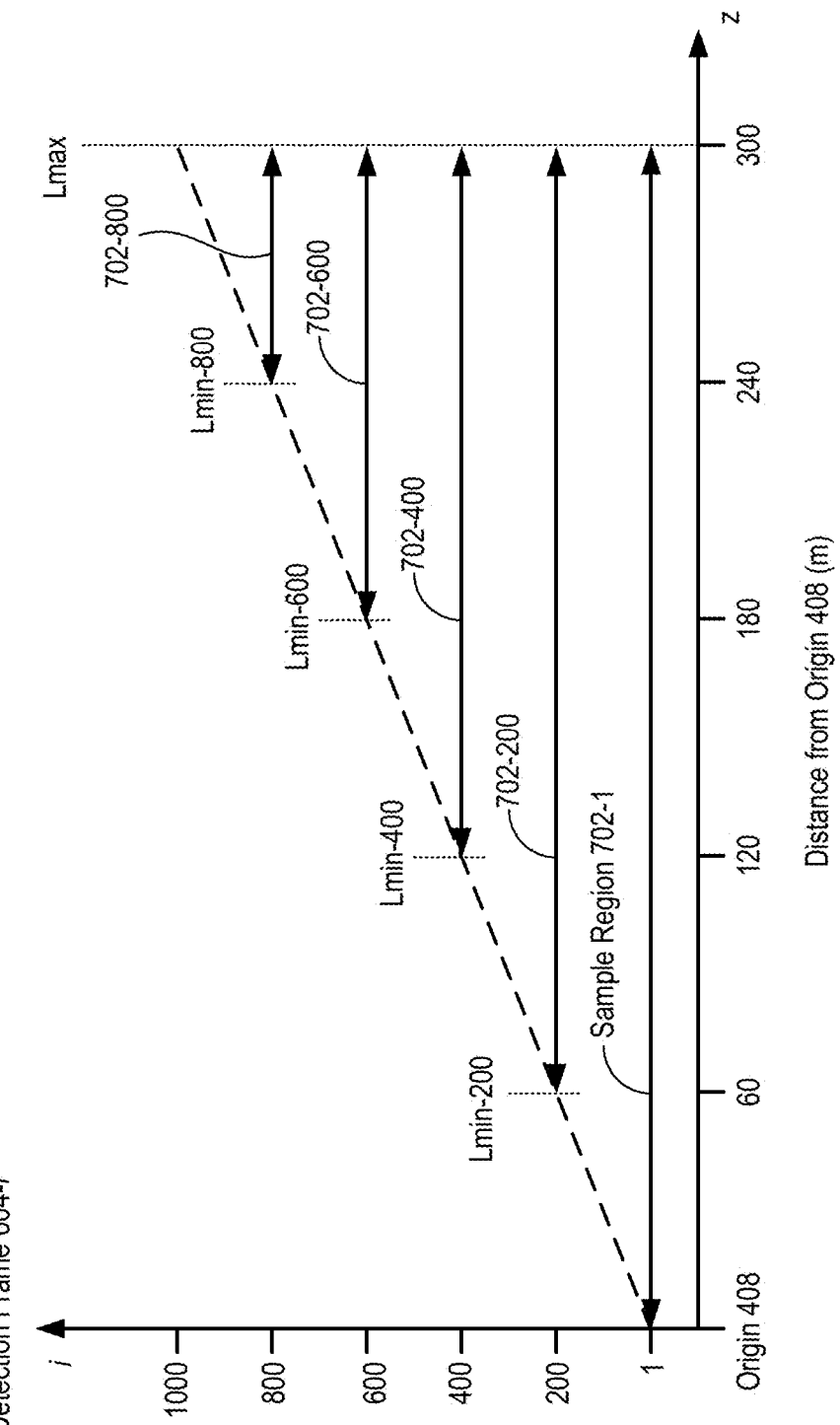
FIG. 8 depicts plot of sample region 702 versus detection frame 604-*i* for image frame 602.

FIG. 8 depicts plot of sample region 702 versus detection frame 604-$i$ for image frame 602. Plot 800 shows the scan range for the sample regions through the sequence of detection frames 604 for a detection region spanning the distance between origin 408 and an Lmax of 300 m.

Figure 9:
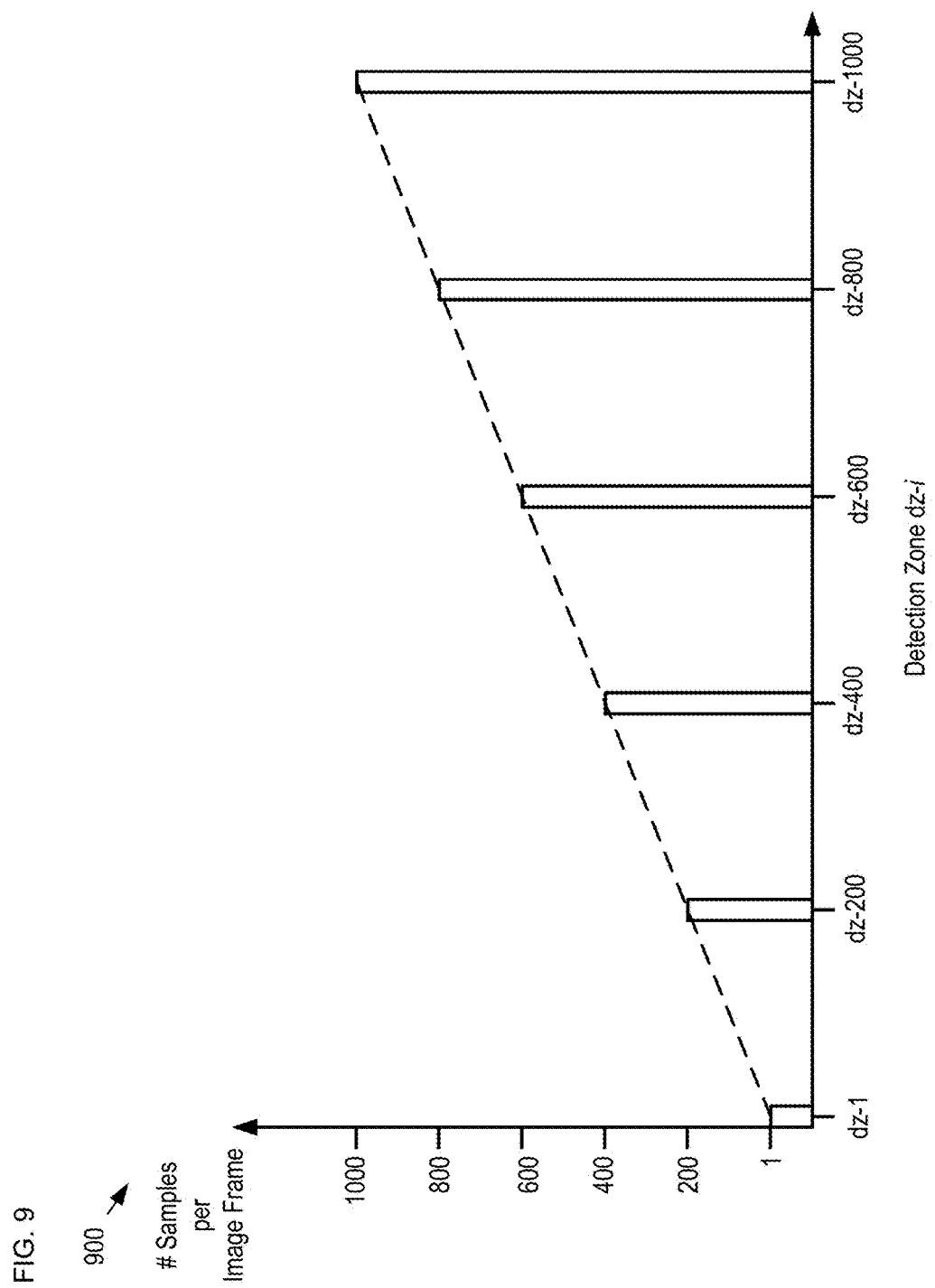
FIG. 9 depicts a histogram of the number of times a detection zone is sampled during an image frame having 1000 detection frames in accordance with the illustrative embodiment.

FIG. 9 depicts a histogram of the number of times a detection zone is sampled during an image frame having 1000 detection frames in accordance with the illustrative embodiment. Plot 900 shows the piecewise-linear increase in the numbers of samples per detection zone through the scan range of detection region 414.

By enabling longer-range areas of a detection region to be sampled more times in an image frame than shorter-range areas, embodiments of the present invention are afforded several advantages over the prior art, such as:

i. higher probability of detecting targets at long range; or ii. higher probability of detecting targets in the presence of noise; or iii. higher probability of detecting targets through obscurants; or iv. improved uniformity of SNR among targets of varying distance; or v. improved uniformity of SNR among targets of varying reflectivity; or vi. reduced maximum motion-induced image blur for a moving target; or vii. reduced maximum motion-induced image blur for a moving LIDAR system; or viii. lower required laser-pulse energy; or ix. reduced number of required detection frames for imaging with high confidence; or x. any combination of i, ii, iii, iv, v, vi, vii, viii, and ix.

FIGS. 10A and 10B depict plots of SNR versus distance through a 200-m long detection region for a prior-art LiDAR system and a LiDAR system in accordance with the present invention, respectively.

Plot 1000 shows the decay in SNR that arises for a GmAPD-based LiDAR system that employs a static gate delay. Plot 1000 evinces that the exemplary system is substantially blind beyond a distance of approximately 90 m into the detection region, where SNR falls below approximately 2.

Plot 1002 demonstrates that the use of a linear gate progression in accordance with system 400 results in an SNR that remains high enough to ensure the ability to detect objects throughout the entire scan range of a detection region. As a result, objects anywhere within the 200-m long detection region are visible since SNR is greater than or equal to 2 over the entire scan length.

Figure 11:
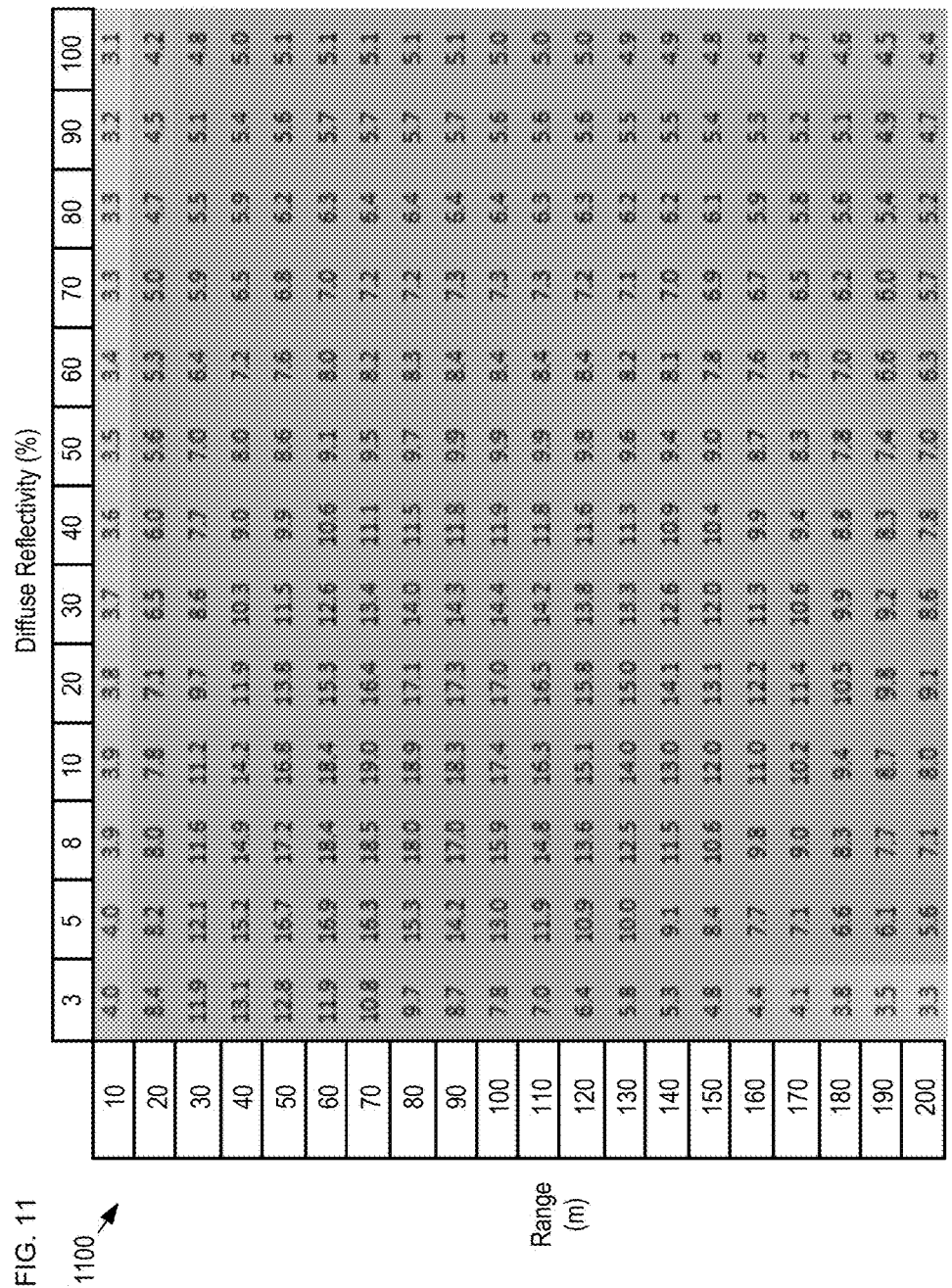
FIG. 11 depicts a simulated plot of SNR with respect to range and reflectivity a LiDAR system employing a gating signal that controls the gate delay according to a linear function in accordance with the illustrative embodiment.

FIG. 11 depicts a simulated plot of SNR with respect to range and reflectivity a LiDAR system employing a gating signal that controls the gate delay according to a linear function in accordance with the illustrative embodiment. Plot 1100 is based on a system employing zero gate delay and having an image frame that includes 160 detection frames.

Based on a minimum acceptable value of SNR of 2, plot 1100 demonstrates that objects having reflectivity within the range of 3% to 100% can be detected with high confidence over the entire range from 0 meters to 200 meters. As compared to plot 300, described above and with respect to FIG. 3, plot 1100 shows that the present invention affords significant improvement over the uniform gate delays applied in prior-art GmAPD LiDAR systems.

Returning now to method 500, at operation 505, receiver 404 detects return signal 412, which is received from detection region 414. In each detection frame 604-$i$, return signal 412 includes reflections of optical pulse 606-$i$ from objects within the detection region.

At operation 506, receiver 404 provides output signal 418 to processor 406. Output signal 418 includes the response of receiver 404 for each of detection frames 604-1 through 604-1000 (i.e., throughout image frame 602).

At operation 507, processor 406 generates a point-cloud image of detection region 414 based on output signal 418.

Although in the illustrative embodiment gating signal 416 controls gate delay 608-$i$ according to a linear function, it will be clear to one skilled in the art, after reading this Specification, how to specify, make, and use alternative embodiments wherein the gate delay is controlled according to any practical function. Functions suitable for use with embodiments of the present invention include, without limitation, exponential functions, polynomial functions, power-law functions, random-number-generating functions, quasi-random-number-generating functions, and the like. In some embodiments, gate delay 608-$i$ is controlled to substantially individually sample one or more detection zones within detection region 414.

Figure 12A:
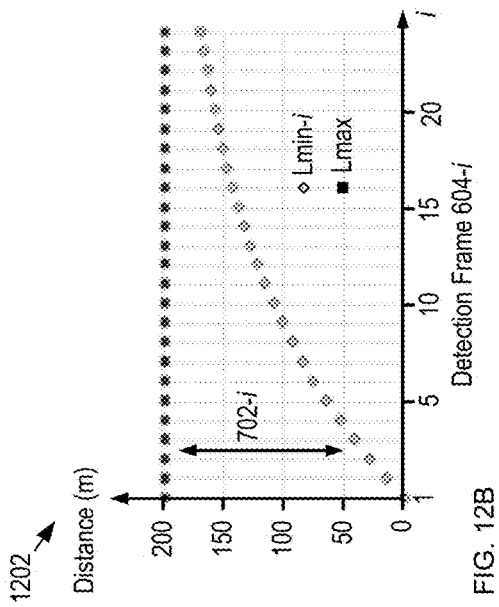
FIGS. 12A-C depict simulations of exemplary functions for controlling the magnitude of the gate delay applied through the sequence of detection frames of an image frame in accordance with the present invention.
Figure 12B:
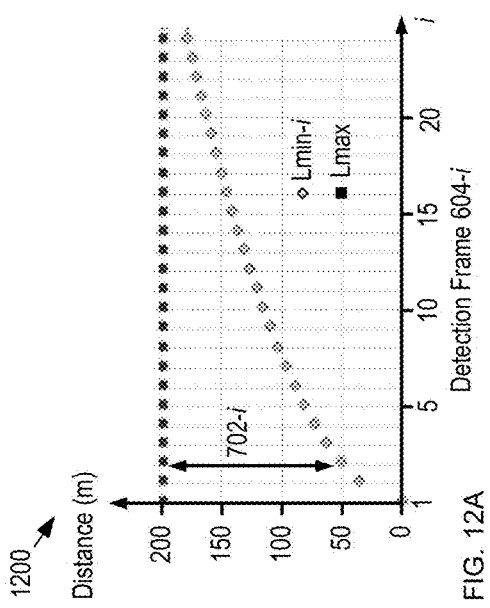
Figure 12C:
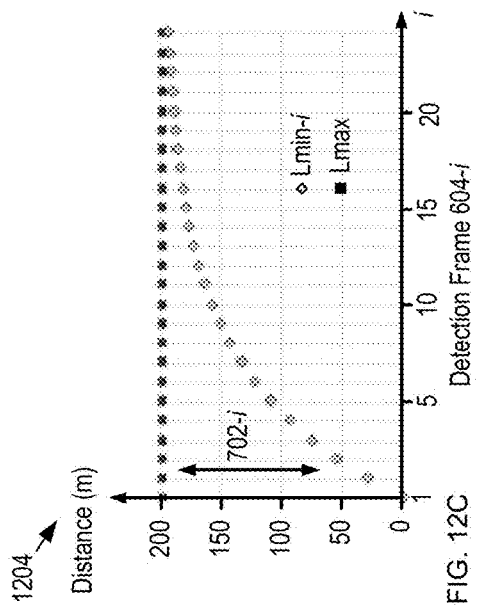

FIGS. 12A-C depict simulations of exemplary functions for controlling the magnitude of the gate delay applied through the sequence of detection frames of an image frame in accordance with the present invention.

Plot 1200 shows the beginning and end points (Lmin and Lmax, respectively) of sample regions scanned using a square-root power progression of gate delay for an image frame that includes 30 detection frames. The starting point, Lmin-$i$, of each sample region 702-$i$ moves progressively deeper into detection region 414 according to the square root of its iteration number, $i$, while all sample regions terminate at an Lmax of 200 meters, as indicated.

The gate-delay progression depicted in plot 1200 is particularly well suited to mitigating problems that arise due to a signal-intensity that falls-off as the inverse square of distance within a detection region. It enables a more uniform SNR throughout the detection region and also mitigates motion blur at short range areas of the detection region (when noise levels are moderate to low).

Plot 1202 shows the beginning and end points (Lmin and Lmax, respectively) of sample regions scanned using an exponentially increasing progression of gate delay for an image frame that includes 30 detection frames. The starting point, Lmin-$i$, of each sample region 702-$i$ moves progressively deeper into detection region 414 at an exponentially decaying rate, while all sample regions terminate at an Lmax of 200 meters, as indicated. For the exponential function depicted in plot 1202, Lmin-$i$ reaches 86.5% of the initial sample region 702-1 at the final iteration of $i$.

The gate-delay progression depicted in plot 1202 is particularly well suited to mitigating the effects of noise with an emphasis on sampling longer-range areas of a detection region.

Plot 1204 shows the beginning and end points (Lmin and Lmax, respectively) of sample regions scanned using an exponentially increasing progression of gate delay for an image frame that includes 30 detection frames. As for the function shown in plot 1202, the starting point, Lmin-$i$, of each sample region 702-$i$ moves progressively deeper into detection region 414 at an exponentially decaying rate, while all sample regions terminate at an Lmax of 200 meters, as indicated. However, the exponential function depicted in plot 1204 decays faster; therefore, Lmin-$i$ reaches 98.2% of the initial sample region 702-1 at the final iteration of $i$.

The gate-delay progression depicted in plot 1204 is also well suited to mitigating the effects of noise; however, as compared to that shown in plot 1202, the gate-delay progression depicted in plot 1204 has a stronger emphasis on sampling longer-range areas of a detection region.

In some embodiments, the function by which gate delay 608-$i$ is controlled is based on an environmental condition, such as ambient light level, visibility conditions, the speed of vehicle 420, the number of objects in detection region 414, and the like. In some embodiments, the function by which gate delay 608-$i$ is controlled is not constant from image frame to image frame. In other words, multiple functions can be used to control gate delay 608-$i$ on an image-frame-by-image-frame basis to improve the fidelity of the image generated for detection region 414.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for generating a point-cloud image of a detection region that extends from a minimum range, Lmin, to a maximum range, Lmax, the method comprising:
    transmitting a first optical signal toward the detection region, wherein the first optical signal comprises an optical pulse train having a first periodicity;
    providing a receiver including at least one single-photon detector;
    establishing a sequence of detection frames having substantially uniform duration, each detection frame having a start time based on the transmission of a different optical pulse of the optical pulse train and a stop time based on Lmax, wherein the sequence of detection frames defines a first image frame; and
    establishing a gating period within each detection frame of the sequence thereof such that each detection frame of the sequence thereof includes only one gating period, wherein the receiver is enabled to detect a single photon received from the detection region only during the gating period;
    wherein each detection frame of the sequence thereof is characterized by a gate delay between its respective start time and its respective gating period; and
    wherein the gate delays of the plurality thereof are non-uniform.

2. The method of claim 1 wherein the magnitude of the gate delays of the plurality thereof changes monotonically through the sequence of detection frames.

3. The method of claim 1 wherein the magnitude of the gate delays of the plurality thereof changes linearly through the sequence of detection frames.

4. The method of claim 1 wherein the magnitude of the gate delays of the plurality thereof changes exponentially through the sequence of detection frames.

5. The method of claim 1 wherein the magnitude of the gate delays of the plurality thereof changes according to a first function through the sequence of detection frames, wherein the first function is selected from the group consisting of a power-law function, a polynomial function, a random-number-generating function, and a quasi-random-number-generating function.

6. The method of claim 1 wherein the at least two gate delays of the plurality thereof have the same magnitude.

7. The method of claim 1 wherein the receiver is provided such that it comprises an imager including a two-dimensional arrangement of single-photon detectors that includes the at least one single-photon detector.

8. The method of claim 1 wherein the system is characterized by a signal-to-noise ratio that exceeds a minimum signal-to-noise ratio over a distance range from the receiver that extends from approximately zero to the maximum range, Lmax.

9. A method for generating a point-cloud image of a detection region that extends from a minimum range, Lmin, to a maximum range, Lmax, the method comprising:
   providing a light detection and ranging (LiDAR) system such that the LiDAR system comprises a transmitter and a receiver comprising at least one single-photon detector, wherein the transmitter is operative for transmitting a first optical signal comprising an optical-pulse train having a first periodicity;
   transmitting the first optical signal toward the detection region;
   establishing a sequence of detection frames having substantially uniform duration, the sequence including N detection frames and each detection frame having a start time that is based on the transmission of a different optical pulse of the optical-pulse train thereof and a stop time based on Lmax, wherein the sequence of detection frames defines a first image frame;
   establishing a plurality of sample regions having non-uniform scan range, wherein the plurality of sample regions includes N sample regions, and wherein the detection region includes each of the plurality of sample regions; and
   for each detection frame of the sequence thereof, enabling the receiver to selectively detect a second optical signal received from a different sample region of the plurality thereof.

10. The method of claim 9 wherein each sample region of the plurality thereof ends at Lmax.

11. The method of claim 10 wherein Lmin changes monotonically through the sequence of detection frames.

12. The method of claim 10 wherein Lmin changes according to a linear function through the sequence of detection frames.

13. The method of claim 10 wherein Lmin changes according to a first function through the sequence of detection frames, wherein the first function is selected from the group consisting of a power-law function, a polynomial function, a random-number-generating function, and a quasi-random-number-generating function.

14. The method of claim 9 wherein the plurality of sample regions are defined by operations comprising:
   for each detection frame;
      establishing a gate delay and a gating period within each detection frame of the sequence thereof, wherein the gating period begins at the end of the gate delay; and
      enabling the receiver to detect a single photon received from the detection region only during the gating period; and
   wherein the plurality of gate delays is established such that their magnitudes are non-uniform through the sequence of detection frames.

15. The method of claim 14 wherein the plurality of gate delays is established such that their magnitudes change through the sequence of detection frames according to a first function, and wherein the first function is selected from the group consisting of a linear function, a power-law function, a polynomial function, a random-number-generating function, and a quasi-random-number-generating function.

16. The method of claim 9 wherein LiDAR system is provided such that the receiver includes an imager including a two-dimensional arrangement of single-photon detectors that includes the at least one single-photon detector, the two-dimensional arrangement defining a focal-plane array.

17. A light detection and ranging (LiDAR) system for estimating a point-cloud image of a detection region that extends from a minimum range, Lmin, to a maximum range, Lmax, the system comprising:
   a transmitter that is operative for transmitting a first optical signal comprising an optical-pulse train having a first periodicity, the optical-pulse train comprising a plurality of optical pulses;
   a receiver comprising at least one single-photon detector; and
   a processor operative for providing a gating signal to the receiver, the gating signal including a sequence of detection frames having substantially uniform duration, wherein each detection frame of the plurality thereof has a start time based on the transmission of a different optical pulse of the optical-pulse train thereof and a stop time based on Lmax, and wherein each detection frame of the plurality thereof includes a gate delay and a single gating period, and further wherein the plurality of gate delays is non-uniform;
   wherein the receiver is enabled to detect a single photon only during the plurality of gating periods.

18. The system of claim 17 wherein the magnitude of the gate delays of the plurality thereof changes linearly through the sequence of detection frames.

19. The system of claim 17 wherein the magnitude of the gate delays of the plurality thereof changes exponentially through the sequence of detection frames.

20. The system of claim 17 wherein the magnitude of the gate delays of the plurality thereof changes through the sequence of detection frames according to a first function that is selected from the group consisting of a power-law function, a polynomial function, and random-number-generating function, and a quasi-random-number-generating function.

21. The system of claim 17 wherein the receiver comprises an imager including a two-dimensional arrangement of single-photon detectors that includes the at least one single-photon detector.

* * * * *